United States Patent
Hayakawa et al.

(10) Patent No.: US 7,133,973 B2
(45) Date of Patent: Nov. 7, 2006

(54) ARITHMETIC PROCESSOR

(75) Inventors: Fumihiko Hayakawa, Kawasaki (JP); Hiroshi Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 10/355,075

(22) Filed: Jan. 31, 2003

(65) Prior Publication Data

US 2003/0163665 A1 Aug. 28, 2003

(30) Foreign Application Priority Data

Feb. 26, 2002 (JP) ............................. 2002-049492

(51) Int. Cl.
*G06G 12/08* (2006.01)
(52) U.S. Cl. .................... 711/137; 711/144; 711/204; 711/138
(58) Field of Classification Search ............... 711/137, 711/145, 152, 141, 144, 204, 169, 138
See application file for complete search history.

(56) References Cited

U.S. PATENT DOCUMENTS

| | | | | |
|---|---|---|---|---|
| 5,687,342 A | * | 11/1997 | Kass ........................... | 711/201 |
| 6,393,527 B1 | * | 5/2002 | Rao et al. ................... | 711/137 |
| 6,438,656 B1 | * | 8/2002 | Arimilli et al. ............. | 711/137 |
| 6,574,712 B1 | * | 6/2003 | Kahle et al. ................ | 711/137 |
| 6,598,124 B1 | * | 7/2003 | Damron et al. ............. | 711/133 |
| 6,748,496 B1 | * | 6/2004 | Scarpino ..................... | 711/137 |
| 6,993,629 B1 | * | 1/2006 | Beardsley et al. .......... | 711/137 |

FOREIGN PATENT DOCUMENTS

| | | | |
|---|---|---|---|
| JP | 362264499 | * | 11/1987 |
| JP | 403113649 | * | 5/1991 |

OTHER PUBLICATIONS

'Methods of Specifying Data Prefetching without using a Separate Instruciton', IBM Technical Disclosure Bulletin, pp. 355-356, Jun. 1995.*
Chi, Chi-Hung and Cheung, Chin-Ming, "Hardware-Driven Prefetching for Pointer Data References," 1998 International Conference on Supercomputing, Melbourne, Australia, 1998, pp. 379-384.*
"Memory Access Cycle Enhancer", IBM Technical Disclosure Bulletin, Dec. 1988.*

* cited by examiner

*Primary Examiner*—Pierre-Michel Bataille
(74) *Attorney, Agent, or Firm*—Arent Fox PLLC

(57) ABSTRACT

An an address generator generates a read address. It is detected whether the generated read address is continuous to the read address previously generated. A cache unit control circuit controls the read data to be directly output to a requester of the read data without passing the read data through a cache RAM, if a cache miss occurs, and if it has been detected that the two addresses are continuous. As a result, the subsequent operations can executed even if the present operation has not been completed.

7 Claims, 7 Drawing Sheets

ARITHMETIC PROCESSOR

CROSS-REFERENCE TO RELATED APPLICATIONS

This application is based upon and claims the benefit of priority from the prior Japanese Patent Application No. 2002-49492, filed on Feb. 26, 2002, the entire contents of which are incorporated herein by reference.

BACKGROUND OF THE INVENTION

1) Field of the Invention

The present invention relates to an arithmetic processor that has improved performance against cache miss.

2) Description of the Related Art

Generally, a central processing unit (CPU) is provided with a cache memory in which instruction or data from the main memory are stored. The cache memory operates at a higher speed than that of the main memory, which is generally provided externally. As a result of provision of the cache memory, the processing speed of the CPU is increased. When a cache hit occurs, the instruction or the like is read from the cache memory and the program is executed without an interruption. When a cache miss occurs, however, the instruction or the like is read from the main memory so that the execution of the program is interrupted until the data is completely read from the main memory.

Figure 1:
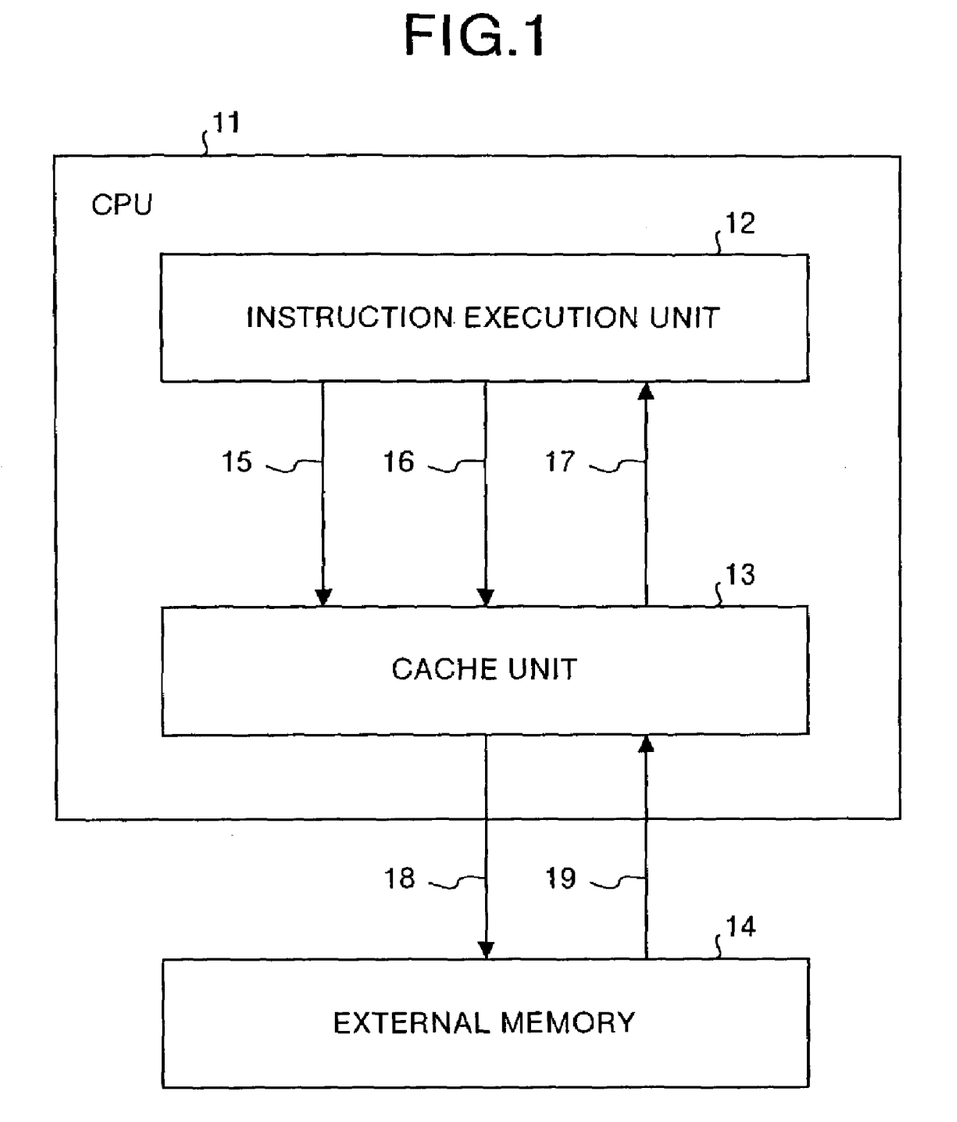
FIG. 1 is a conceptual view that explains the cache memory.

FIG. 1 explains the concept of the cache memory. A CPU 11 is provided with an instruction execution unit 12 and a cache unit 13. The cache unit 13 is connected to an external (with respect to the CPU 11) memory 14. When data is to be read, the CPU 11 provides a data read request 15 and a read address 16 to the cache unit 13. If requested data is available in the cache unit 13 (i.e., when the cache hit occurs), the cache unit 13 supplies the requested data 17 to the instruction execution unit 12.

If the requested data is not available in the cache unit (i.e., when a cache miss occurs), the cache unit 13 outputs a data read request 18 to the external memory 14 and reads the requested data 19 from the external memory 14. The data 19 read from the external memory 14 is stored in the cache memory and also fed to the instruction execution unit 12.

Figure 2:
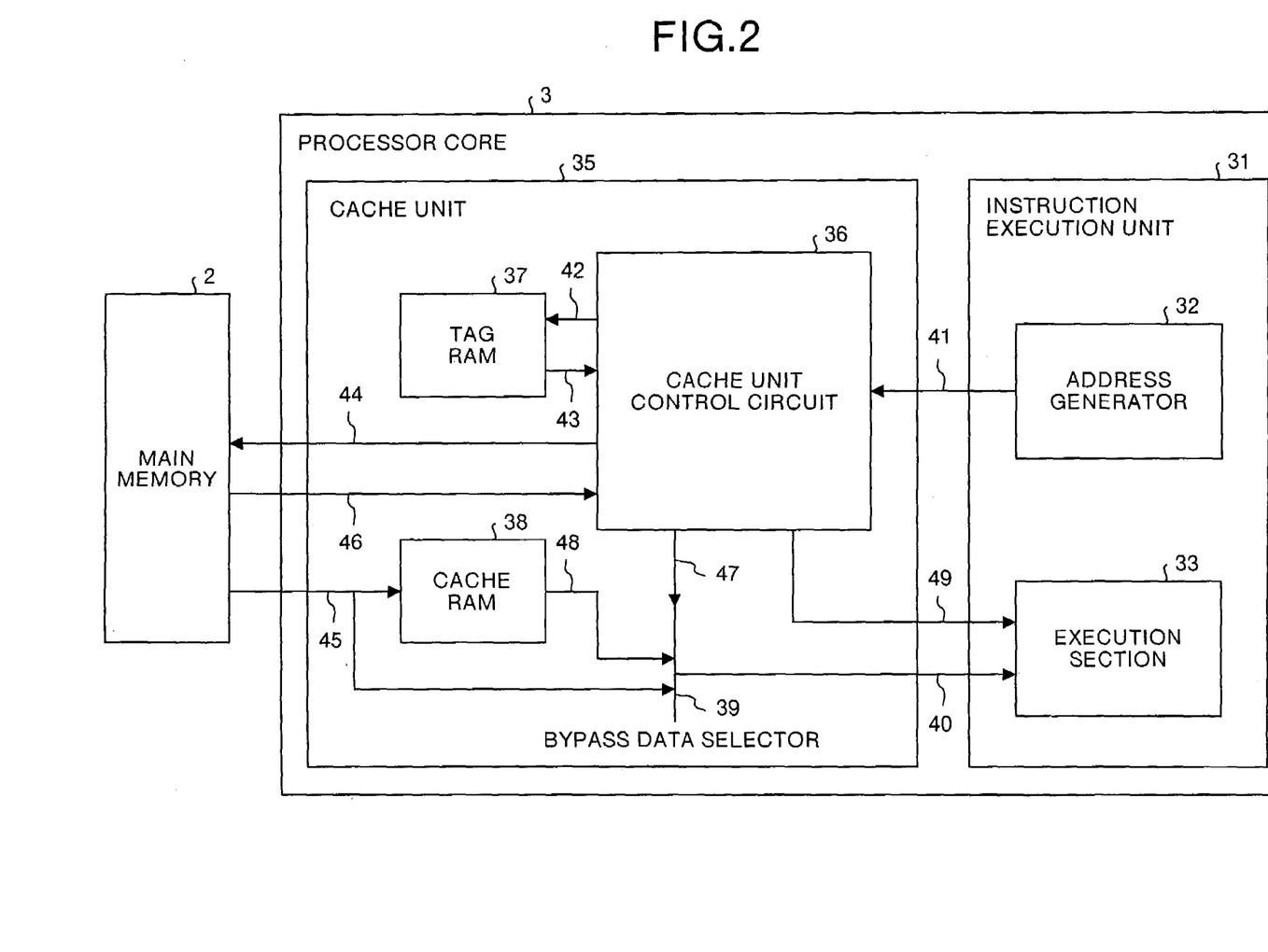
FIG. 2 is a block diagram that shows the configuration of a cache memory in a conventional arithmetic processor.

FIG. 2 is the concrete configuration of a cache memory in the conventional arithmetic processor. A processor core 3 includes an instruction execution unit 31 and a cache unit 35. The instruction execution unit 31 includes an address generator 32 and an execution section 33. The cache unit 35 includes a cache unit control circuit 36, a tag random access memory (RAM) 37, a cache RAM 38, and a bypass data selector 39. A main memory is connected to the cache unit 35 through a bus. Normally, the capacity (assumed to be "L-bytes") of one line of the cache RAM 38 is larger than the bus width (assumed to be "B-bytes") between the main memory 2 and the cache unit 35.

Figure 3:
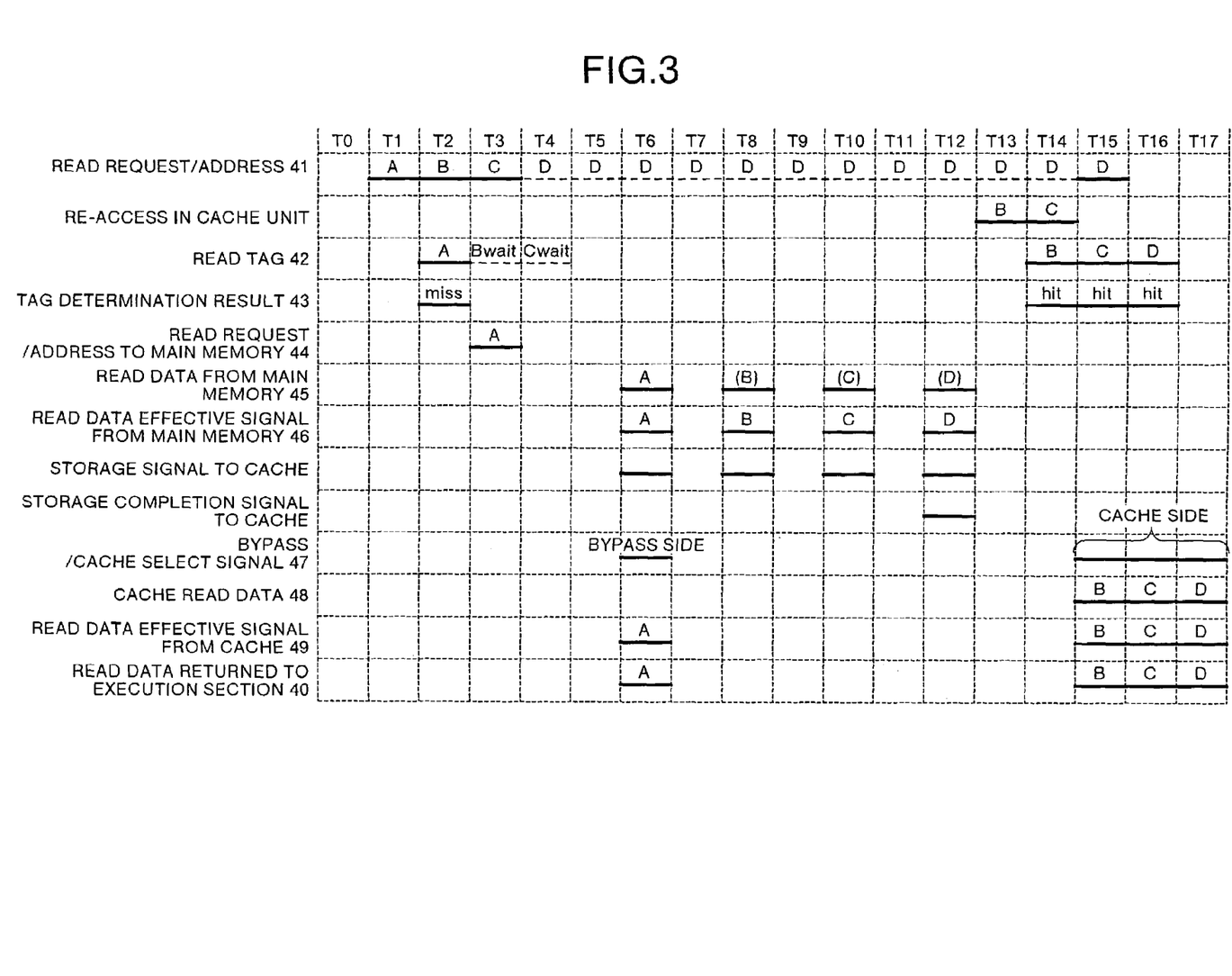
FIG. 3 is a time chart that shows operation timings related to the cache memory in the conventional arithmetic processor.

FIG. 3 is a time chart that shows operation timings if a cache miss occurs in the cache memory in the conventional arithmetic processor. For the convenience of explanation, it is assumed herein that operations A, B, C and D have addresses in the same cache line and that the addresses are continuous in the order of parenthesized alphabets shown in FIG. 3. It is also assumed that a cache miss occurs when data on the operation A is read. In a cycle T1, the address generator 32 feeds a data read request and a read target address for the operation A, to the cache unit control circuit 36 (see an arrow 41 in FIG. 2).

In a cycle T2, the cache unit control circuit 36 refers to an address tag in the tag RAM 37 so as to determine whether the data on the operation A exists in the cache RAM 38 (see an arrow 42 in FIG. 2). As a result, in the cycle T2, the cache unit control circuit 36 obtains a determination result that a cache miss occurs for the operation A (see an arrow 43 in FIG. 2). In the cycle T2, the address generator 32 feeds a data read request and a read target address for the operation B, to the cache unit control circuit 36 (see an arrow 41 in FIG. 2).

In a cycle T3, the cache unit control circuit 36 feeds the data read request and the read target address for the operation A, to the main memory 2 (see an arrow 44 in FIG. 2). In addition, in the cycle T3, the operation B that has been accepted waits for the completion of the operation A in the cache unit 35. In the cycle T3, the address generator 32 feeds a data read request and a read target address for the operation C, to the cache unit control circuit 36 (see an arrow 41 in FIG. 2) In a cycle T4, the operation C that has been accepted is stopped for the completion of the operation A in the cache unit 35. Thereafter, the operation D which follows the operation C is not accepted.

In each of cycles T6, T8, T10 and T12, the data corresponding to the address requested to the main memory 2 is divided L/B times (where L is the capacity of one line of the cache RAM 38 and B is the bus width between the main memory 2 and the cache unit 35) and read from the main memory 2 (see an arrow 45 in FIG. 2). At this moment, the operations A, B, C and D that correspond to the one-line capacity of the cache RAM 38 are stored in the cache RAM 38.

In a cycle T6 in which the data corresponding to the operation A is read, an effective signal indicating that the read data is effective is transmitted from the main memory 2 to the cache unit control circuit 36 (see an arrow 46 in FIG. 2). The cache unit control circuit 36 feeds a control signal for selecting a bypass side, to the bypass data selector 39 (see an arrow 47 in FIG. 2). As a result, the data on the operation A read from the main memory 2 is also, directly fed to the execution section 33 (see an arrow 40 in FIG. 2). At the same time, the cache unit controller 36 transmits an effective signal indicating that the read data is effective, to the execution section 33 (see an arrow 49 in FIG. 2).

In each of the cycle T8 in which the data corresponding to the operation B is read, the cycle T10 in which the data corresponding to the operation C is read and the cycle T12 in which the data corresponding to the operation D is read, an effective signal indicating that the read data is effective is transmitted from the main memory 2 to the cache unit control circuit 36 (see an arrow 46 in FIG. 2).

In the cycle T12, if the data is completely stored in the cache RAM 38, the processing for the operation A is considered to be completed. The operation B that waits in the cache unit 35 is re-executed in the next cycle T13. In a cycle T14, the cache unit control circuit 36 refers to the address tag in the tag RAM 37 so as to determine whether the data on the operation B exists in the cache RAM 38 (see an arrow 42 in FIG. 2).

Following the reading of the data on the operation A from the main memory 2, the data on the operation B is stored in the cache RAM 38. Therefore, in the cycle T14, the cache unit control circuit 36 obtains a determination result that a cache hit occurs for the operation B (see an arrow 43 in FIG. 2). Further, in the cycle T14, the operation C is re-executed.

In a cycle T15, the cache unit control circuit 36 transmits a control signal for selecting the cache side, to the bypass data selector 39 (see an arrow 47 in FIG. 2). As a result, the data on the operation B is read from the cache RAM 38 (see an arrow 48 in FIG. 2) and fed to the execution section 33 (see an arrow 40 in FIG. 2). At the same time, the cache unit controller 36 transmits an effective signal indicating that the cache read data is effective (see an arrow 49 in FIG. 2). In a cycle T15, the cache unit control circuit 36 refers to the address tag in the tag RAM 37 so as to determine whether the data on the operation C exists in the cache RAM 38 (see an arrow 42 in FIG. 2).

The data on the operation C is already stored in the cache RAM 38 similarly to the data on the operation B. In the cycle 15, therefore, the cache unit control circuit 36 obtains a determination result that a cache hit occurs for the operation C (see an arrow 43 in FIG. 2). In addition, since the processing in the cache unit 35 is completed in the cycle T15, the operation D which follows the operation C is accepted.

In a cycle T16, the cache unit control circuit 36 transmits a control signal for selecting the cache side, to the bypass data selector 39 (see an arrow 47 in FIG. 2). As a result, the data on the operation C is read from the cache RAM 38 (see an arrow 48 in FIG. 2) and fed to the execution section 33 (see an arrow 40 in FIG. 2). At the same time, an effective signal indicating that the cache read data is effective is transmitted to the execution section 33 (see an arrow 49 in FIG. 2). Further, in the cycle T16, the address tag is refereed for the operation D (see an arrow 42 in FIG. 2). As a result, a cache hit occurs for the operation D (see an arrow 43 in FIG. 2).

In a cycle T17, the cache unit control circuit 36 transmits a control signal for selecting the cache side, to the bypass data selector 39 (see an arrow 47 in FIG. 2). As a result, the data on the operation D is read from the cache RAM 38 (see an arrow 48 in FIG. 2) and fed to the execution section (see an arrow 40 in FIG. 2). At the same time, an effective signal indicating that the cache read data is effective, is transmitted to the execution section 33 (see an arrow 49 in FIG. 2).

However, the conventional cache memory has a prominent disadvantage when a cache miss occurs. When a cache miss occurs, for example, for the operation A in the above example, the operations B to D which follow the operation A have to be stopped until the operation A is completed.

Therefore, the read data on the operations B to D are not returned to the execution section 33 until data by as much as one cache line including the data on the operation A, i.e., all the data on the operations A to D is read from the main memory 2, the operation A is re-executed and a cache hit/cache miss determination is made for the operation A. In the example shown in FIG. 3, the operation B is re-executed in the cycle T13, which indicates that quite a heavy penalty is imposed.

SUMMARY OF THE INVENTION

It is an object of the present invention to provide an arithmetic processor comprised of a cache memory in which even if a cache miss occurs for a certain operation, a penalty imposed on operations which follow the operation is light.

To achieve the above object, according to one aspect of this invention, an arithmetic processor comprises an address generation section which generates a data read address, a continuous address detection circuit which detects that the generated read address is continuous to the previously generated read address, and a control circuit which controls the currently generated read address to be read from an external main memory and to be directly output to a data read requester without going through a cache memory.

If a cache miss occurs when data on a certain operation is read and data on operations which follow the certain operation have addresses continuous to the address of the certain operation, then the data on the subsequent operations is read from the main memory and that data is directly output to a data read requester without going through a cache RAM. As a result, the subsequent operations are executed.

These and other objects, features and advantages of the present invention are specifically set forth in or will become apparent from the following detailed descriptions of the invention when read in conjunction with the accompanying drawings.

DETAILED DESCRIPTIONS

Embodiments of the arithmetic processor according to the present invention will be explained hereinafter in detail with reference to the accompanying drawings.

Figure 4:
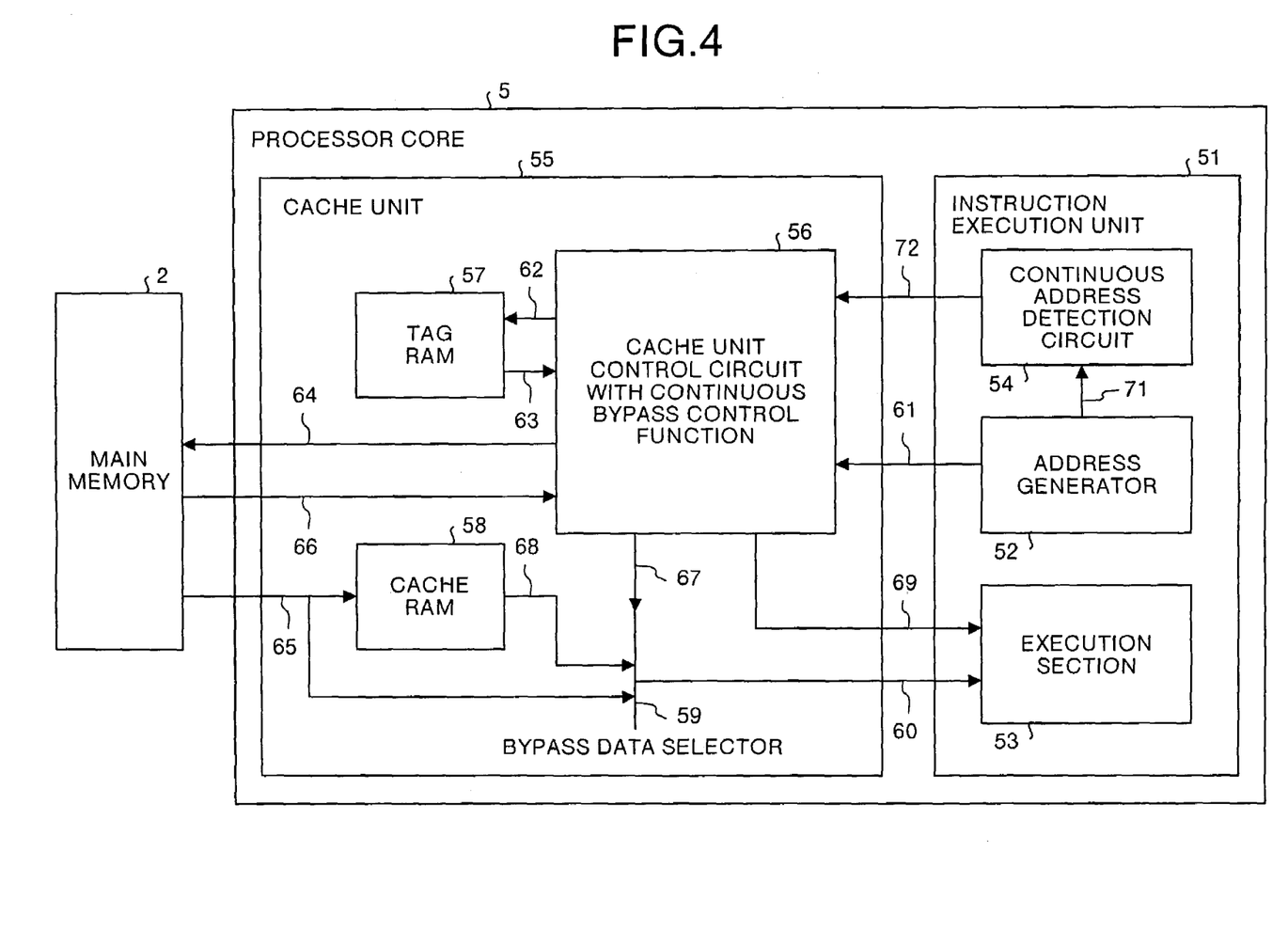
FIG. 4 is a block diagram that shows the configuration of a cache memory in an arithmetic processor in a first embodiment according to the present invention.

FIG. 4 shows the configuration of a cache memory in an arithmetic processor in a first embodiment according to the present invention. A processor core 5 includes an instruction execution unit 51 that controls the overall operations of the processor core 5 and a cache unit 55. The instruction execution unit 51 includes a continuous address detection circuit 54, an address generator 52, and an execution section 53. The execution section 53 is the one that makes a data read request, that is, a requester.

The cache unit 55 includes a cache unit control circuit with a continuous bypass control function ("cache unit control circuit") 56, a tag RAM 57 (i.e., a tag memory), a cache RAM 58 (i.e., a cache memory), and a bypass data selector 59.

The address generator 52 generates a data read request and a read address, and feeds them to the cache unit control circuit 56. The address generator 52 also feeds the read address to the continuous address detection circuit 54. The execution section 53 receives the read data fed from the cache unit 55 through the bypass data selector 59, and an effective signal indicating the effective timing of the read data from the cache unit control circuit 56.

The continuous address detection circuit 54 receives the read address fed from the address generator 52. If detecting that the received read address is continuous to the address of an operation just performed, the continuous address detection circuit 54 notifies the cache unit control circuit 56 of a continuous address flag as a signal attached to the read request and the read address notified to the circuit 56.

Although not shown in FIG. 4, the continuous address detection circuit 54 consists of, for example, an adder that increments the read address fed from the address generator 52 by one, a register that holds the incremented address, a comparator that compares the address held in the register with a read address fed next from the address generator 52, and the like.

The cache unit control circuit 56 receives the data read request and the read address fed from the address generator 52, and determines whether a cache hit/a cache miss occurs based on the received address. The cache unit control circuit 56 makes a preparation at a timing at which the location of necessary data can be determined and the data can be returned to the execution section 53. The cache unit control circuit 56 also returns an effective signal indicating a data effective timing to the execution section 53.

The cache unit control circuit 56 has not only these cache unit control circuit functions but also the following continuous bypass control function. The cache unit control circuit 56 receives the continuous address flag fed from the continuous address detection circuit 54, detects that data can be bypassed continuously based on the flag and thus bypasses the data. In other words, the cache unit control circuit 56 outputs a bypass/cache select signal to the bypass data selector 59 as a control signal based on the cache hit/cache miss determination result or the continuous address flag fed from the address detection circuit 54.

The tag RAM 57 holds an address tag employed to search whether the data requested by the instruction execution unit 51 is stored in the cache RAM 58. The cache RAM 58 stores data required and to be processed by the execution section 53. The bypass data selector 59 selects one of a bypass route, along which the data read from the external main memory 2 is directly fed to the execution section 53 without going through the cache RAM 58, and a route, along which the data read from the cache RAM 58 is fed to the execution section 53, based on the bypass/cache select signal fed from the cache unit control circuit 56.

Figure 5:
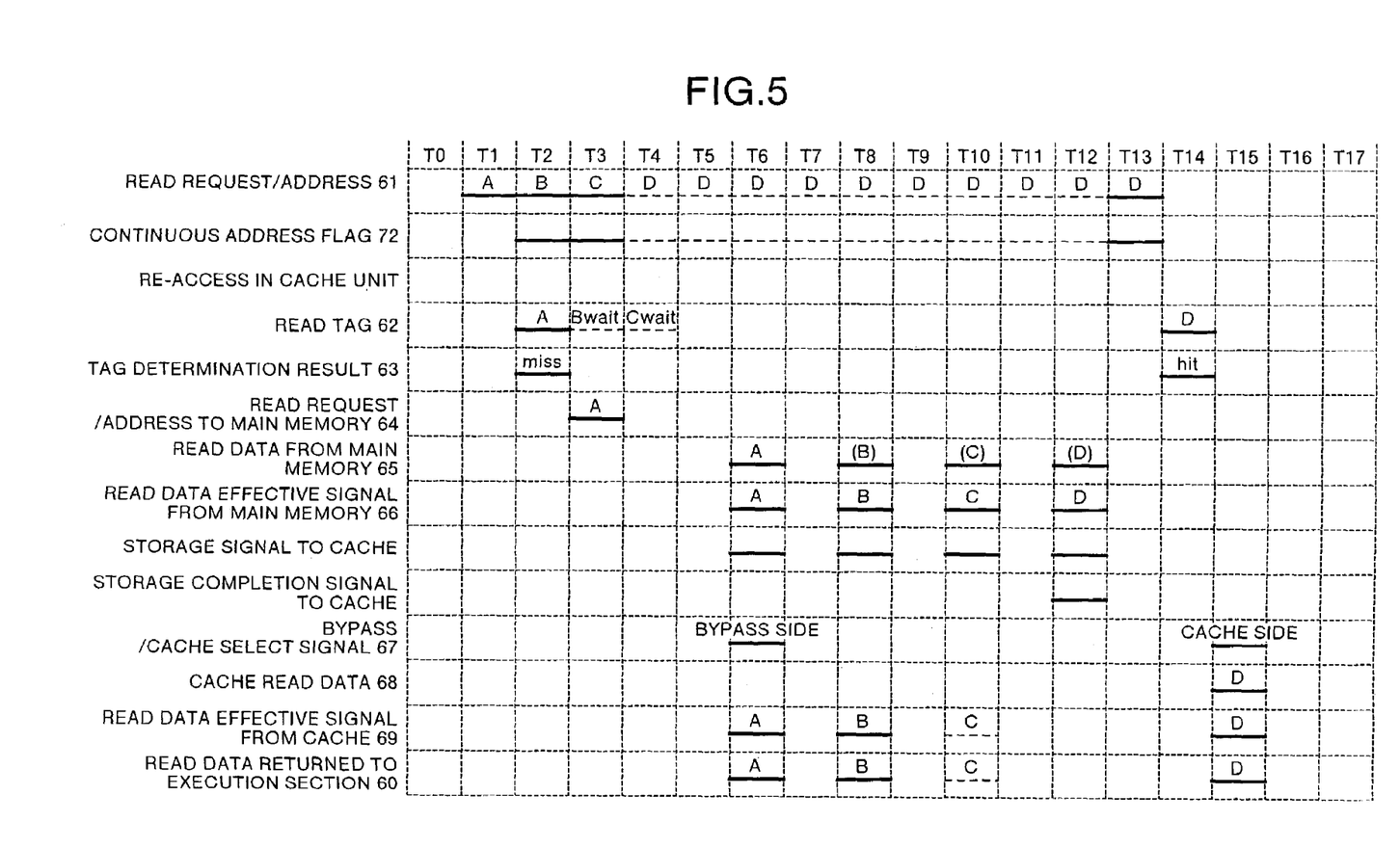
FIG. 5 is a time chart that shows operation timings related to the cache memory in the arithmetic processor in the first embodiment according to the present invention.

FIG. 5 is a time chart that shows operation timings if a cache miss occurs to the cache memory of the arithmetic processor in the first embodiment according to the present invention. For the convenience of explanation, it is assumed herein that operations A, B, C and D have addresses in the same cache line and that the addresses are continuous in the order of parenthesized alphabets in FIG. 5. It is also assumed that a cache miss occurs when data on the operation A is read.

In a cycle T1, the address generator 52 feeds a data read request and a read target address for the operation A, to the cache unit control circuit 56 (see an arrow 61 in FIG. 4). The address generator 52 also feeds the read address of the operation A to the continuous address detection circuit 54 (see an arrow 71 in FIG. 4).

In a cycle T2, the cache unit control circuit 56 refers to the address tag in the tag RAM 57 so as to determine whether the data on the operation A exists in the cache RAM 58 (see an arrow 62 in FIG. 4). As a result, in the cycle T2, the cache unit control circuit 62 obtains a determination result that a cache miss occurs for the operation A (see an arrow 63 in FIG. 4). In the cycle T2, the address generator 52 also feeds a data read request and a read target address for the operation B, to the cache unit control circuit 56 (see an arrow 61 in FIG. 4). The address generator 52 feeds the read address of the operation B to the continuous address detection circuit 54 (see an arrow 71 in FIG. 4). Since the address of the operation B is continuous to that of the operation A, the continuous address detection circuit 54 notifies the cache unit controller 56 of a continuous address flag (see an arrow 72 in FIG. 4).

In a cycle T3, the cache unit control circuit 56 feeds the data read request and the read target address for the operation A, to the main memory 2 (see an arrow 64 in FIG. 4). In the cycle T3, the operation B that has been accepted waits for the completion of the operation A in the cache unit 55. Further, in the cycle T3, the address generator 52 feeds a data read request and a read target address for the operation C, to the cache unit control circuit 56 (see an arrow 61 in FIG. 4). The address generator 52 also feeds the read address of the operation C to the continuous address detection circuit 54 (see an arrow 71 in FIG. 4).

Since the address of the operation C is continuous to that of the operation B, the continuous address detection circuit 54 notifies the cache unit control circuit 56 of a continuous address flag (see an arrow 72 in FIG. 4). In a cycle T4, the operation C that has been accepted waits for the completion of the operation A in the cache unit 55. Thereafter, the operation D which follows is not accepted.

In each of cycles T6, T8, T10 and T12, the data corresponding to the address requested to the main memory 2 is divided L/B times and read from the main memory 2 (see an arrow 65 in FIG. 4). Symbols L and B denote the capacity of one line of the cache RAM 58 and the bus width between the main memory 2 and the cache unit 55, respectively and satisfy the relationship of L>B. At this time, the operations A, B, C and D that correspond to the one-line capacity of the cache RAM 58 are stored in the cache RAM 58.

In the cycle T6 in which the data corresponding to the operation A is read, the main memory 2 feeds an effective signal indicating that the read data is effective, to the cache unit control circuit 56 (see an arrow 66 in FIG. 4). The cache unit control circuit 56 transmits a bypass/cache select signal for selecting a bypass side, to the bypass data selector 59 (see an arrow 67 in FIG. 4). As a result, the data on the operation A read from the main memory 2 is also, directly fed to the execution section 53 (see an arrow 60 in FIG. 4). At the same time, the cache unit control circuit 56 transmits an effective signal indicating that the data on the operation A is effective as cache read data, to the execution section 53 (see an arrow 69 in FIG. 4).

In the cycle T8 in which the data corresponding to the operation B that waits is read, an effective signal indicating that the read data is effective is transmitted from the main memory 2 to the cache unit control circuit 56 (see an arrow 66 in FIG. 4). Since the continuous address flag is attached to the operation B, the data on the operation B read from the main memory 2 in this cycle T8 is directly fed to the execution section 53 (see an arrow 60 in FIG. 4). At the same time, the cache unit control circuit 56 transmits an effective signal indicating that the data on the operation B is effective as cache read data to the execution section 53 (see an arrow 69 in FIG. 4). At this moment, i.e., in the cycle T8, the operation B is considered to be completed in the cache unit 55.

In the cycle T10 in which the data corresponding to the operation C that waits is read, an effective signal indicating that the read data is effective is transmitted from the main memory 2 to the cache unit control circuit 56 (see an arrow 66 in FIG. 4). Since the continuous address flag is attached to the operation C, the data on the operation C read from the main memory 2 is directly fed to the execution section 53 similarly to the operation B (see an arrow 60 in FIG. 4). At the same time, the cache unit control circuit 56 transmits an effective signal indicating that the data on the operation C is effective as cache read data to the execution section 53 (see an arrow 69 in FIG. 4). In the cycle T10, the operation C is considered to be completed in the cache unit 55.

By this time, the operation D is not accepted. However, following the reading of the data on the operation A from the main memory 2, the operation D is read from the main memory 2. In the cycle T12 in which the data corresponding to the operation D is read, an effective signal indicating that the read data is effective is transmitted from the main memory 2 to the cache unit control circuit 56 (see an arrow 66 in FIG. 4).

In the cycle T12, if the data is completely stored in the cache RAM 58, the processing for the operation A is completed. At this moment, there exist no operations that wait in the cache unit 55. Therefore, in the cycle T13, the operation D which follows is accepted. In the cycle T14, the cache unit control circuit 56 refers to the address tag in the tag RAM 57 for the operation D (see an arrow 62 in FIG. 4). Since the data corresponding to the operation D is already stored in the cache RAM 58 as explained above, a cache hit occurs for the operation D (see an arrow 63 in FIG. 4). Therefore, although the continuous address flag is attached to the operation D, the continuous address flag does not influence the operation of the cache memory.

In a cycle T15, the cache unit control circuit 56 transmits a bypass/cache select signal for selecting the cache side, to the bypass data selector 59 (see an arrow 67 in FIG. 4). As a result, the data on the operation D is read from the cache RAM 58 (see an arrow 68 in FIG. 4) and fed to the execution section 53 (see an arrow 60 in FIG. 4). At the same time, an effective signal indicating that the cache read data is effective is transmitted to the execution section 53 (see an arrow 69 in FIG. 4).

According to the first embodiment, even if a cache miss occurs when data on the operation A is read, the operation B that has an address continuous to that of the operation A and the operation C that has an address continuous to that of the operation B are executed without waiting for the data by as much as the capacity of one line of the cache RAM 58 including the data on the operation A to be read from the main memory 2 and stored in the cache RAM 58. It is, therefore, possible to realize a cache memory in which a penalty imposed on the operations B and C which follow the operation A is light.

Figure 6:
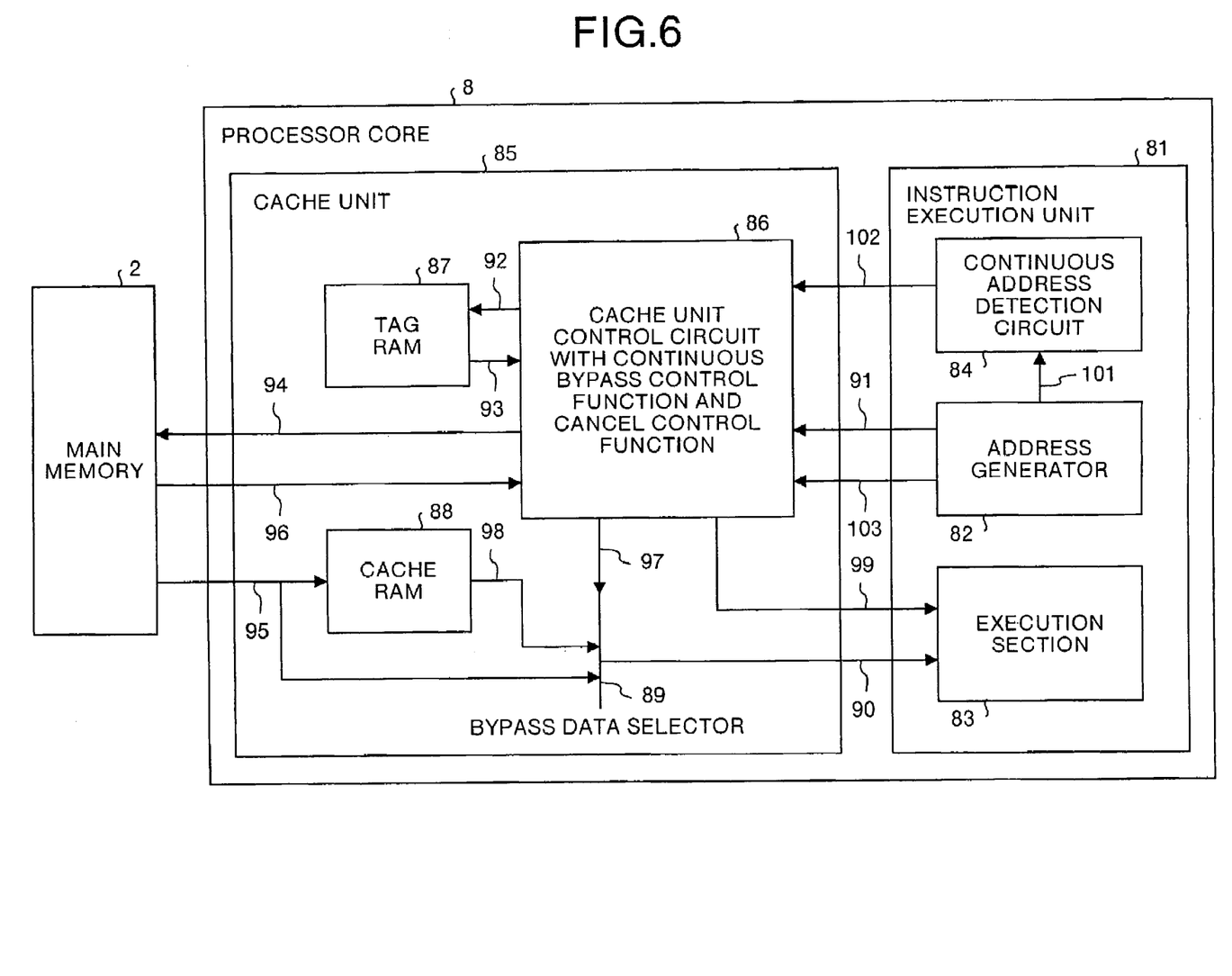
FIG. 6 is a block diagram that shows the configuration of a cache memory in an arithmetic processor in a second embodiment according to the present invention.

FIG. 6 shows the configuration of a cache memory in an arithmetic processor in a second embodiment according to the present invention. A processor core 8 includes an instruction execution unit 81 that controls the overall operations of the processor core 8 and a cache memory 85. The instruction execution unit 81 includes a continuous address detection circuit 84, an address generator 82, and an execution section 83. The cache unit 85 includes a cache unit control circuit with a continuous bypass control function and a cancel control function ("cache unit control circuit") 86, a tag RAM 87, a cache RAM 88, and a bypass data selector 89.

The address generator 82, similarly to that in the first embodiment, issues a data read request, generates a read address, transmits the request and the read address to the cache unit controller 86, and transmits the read address to the continuous address detection circuit 84. If the execution of a preceding operation becomes unnecessary, that is, the execution thereof is cancelled, the address generator 82 detects the cancellation and notifies the cache unit control circuit 86 of the cancellation. Since the execution section 83 and the continuous address detection circuit 84 are the same as the execution section 53 and the continuous address detection circuit 54 in the first embodiment, respectively, they will not be explained herein.

The cache unit control circuit 86, similarly to that in the first embodiment, has cache unit control circuit functions that include determining whether a cache hit/cache miss occurs, preparing read data, returning an effective signal to the execution section 83 and the like, and a continuous bypass control function of bypassing data having continuous addresses. The cache unit control circuit 86 also has a control function of canceling continuous bypassing. Since the tag RAM 87, the cache RAM 88 and the bypass data selector 89 are the same as the tag RAM 57, the cache RAM 58 and the bypass data selector 59 in the first embodiment, respectively, the explanation will be omitted.

Figure 7:
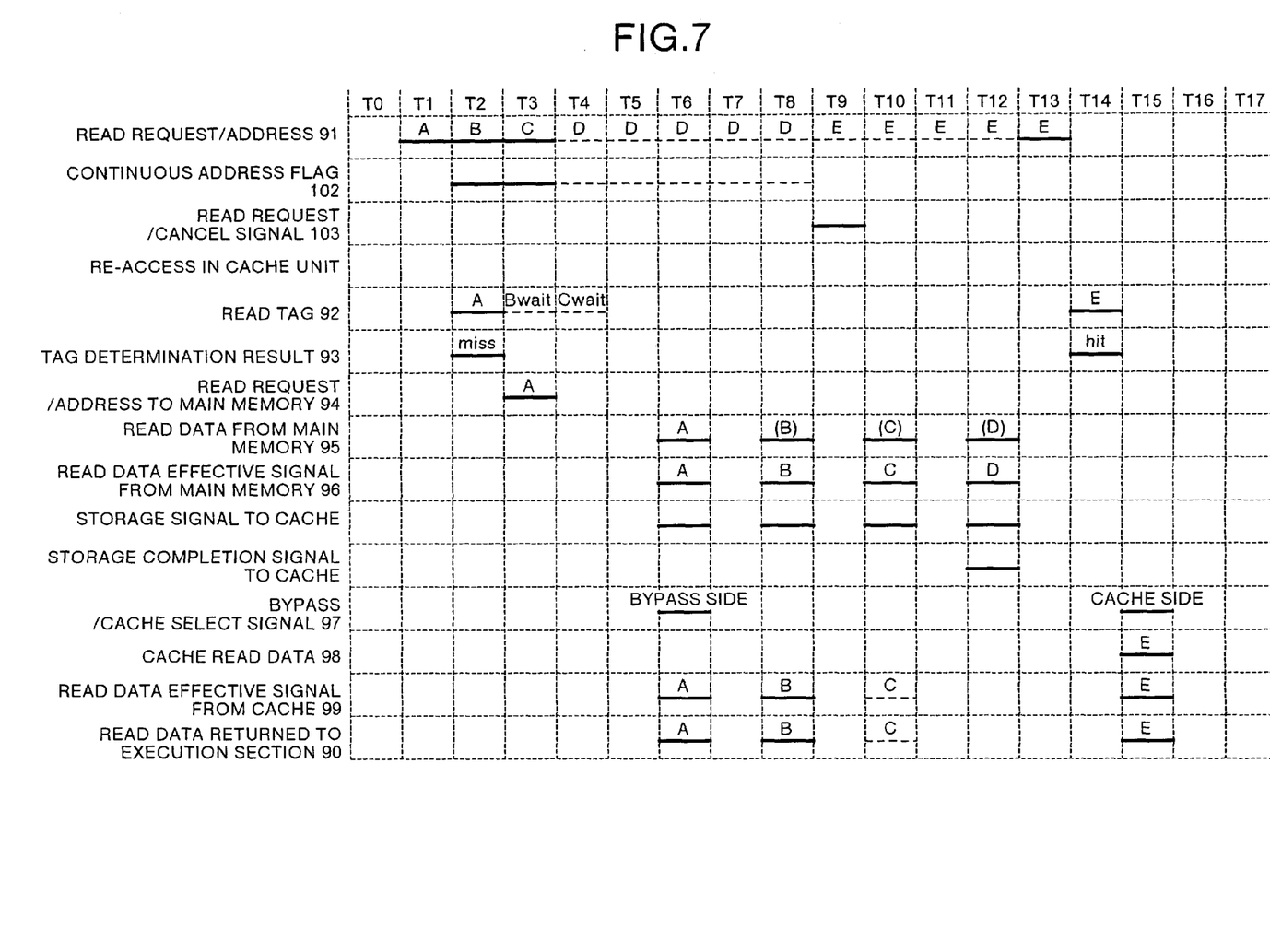
FIG. 7 is a time chart that shows operation timings related to the cache memory in the arithmetic processor in the second embodiment according to the present invention.

FIG. 7 is a time chart that shows operation timings if a cache miss occurs to the cache memory of the arithmetic processor in the second embodiment according to the present invention. For the convenience of explanation, it is assumed herein that operations A, B, C and D have addresses in the same cache line and that the addresses are continuous in the order of parenthesized alphabets in FIG. 7. It is also assumed that a cache miss occurs when data on the operation A is read. It is further assumed that in a cycle T9, the execution of operations already received in the cache unit 85 becomes unnecessary because of an external factor, a cancellation occurs and an operation E which is completely different from the operations A to D is issued. Since the operations by the cycle T9 are the same as those in the first embodiment, the explanation will be omitted.

In each of cycles T6, T8, T10 and T12, the data corresponding to the address requested to the main memory 2 is divided L/B times and read from the main memory 2 (see an arrow 95 in FIG. 6). Symbols L and B denote the capacity of one line of the cache RAM 88 and the bus width between the main memory 2 and the cache unit 85, respectively and satisfy the relationship of L>B. At this time, the operations A, B, C and D that correspond to the one-line capacity of the cache RAM 88 are stored in the cache RAM 88.

As explained above, in the cycle T9, the execution of the operations is cancelled because of an external factor and a request cancel signal is issued to the cache unit control circuit 86 (see an arrow 103 in FIG. 6). Further, in the cycle T9, the operation E is issued but is not received at this moment.

In a cycle T10, the data corresponding to the operation C that waits is read. In the cycle T10, an effective signal indicating that the read data is effective is also transmitted from the main memory 2 to the cache unit control circuit 86 (see an arrow 96 in FIG. 6). Although the continuous address flag is attached to the operation C, the continuous address is cleared by the cache unit control circuit 86 now that the cache unit control circuit 86 accepts the cancellation in the cycle T9.

As a result, the data on the operation C read from he main memory 2 is not fed to the execution section 83 nd the operation C is not executed. In other words, the execution of the operation C is cancelled. In this case, if the continuous address flag is cleared by the cache unit control circuit 86, the operations received in the cache unit 85 are treated to be independent of one another. This means, therefore, that the cancellation processing performed at that time is an ordinary cancellation processing.

The operation D is not accepted at this moment. However, following the reading of the data on the operation A from the main memory 2, the operation D is read from the main memory 2. The data which corresponds to the operation D is read in a cycle T12 and, at the same time, an effective signal indicating that the read data is effective is transmitted from the main memory 2 to the cache unit control circuit 86 (see an arrow 96 in FIG. 6).

In the cycle T12, of the data is completely stored in the cache RAM 88, the processing for the operation A is completed. Since no operations that wait exist in the cache unit 85 at that moment, the operation E is accepted in a cycle T13. In a cycle T14, the cache unit control circuit 86 refers to the address tag in the tag RAM 87 for the operation E (see an arrow 92 in FIG. 6). Since the data corresponding to the operation E is stored in the cache RAM 88, a cache hit occurs for the operation E (see an arrow 93 in FIG. 6).

In a cycle T15, the cache unit control circuit 86 transmits a bypass/cache select signal for selecting a cache side, to the bypass data selector 89 (see an arrow 97 in FIG. 6). As a result, the data on the operation E is read from the cache RAM 88 (see an arrow 98 in FIG. 6) and fed to the execution section 83 (see an arrow 90 in FIG. 6). At the same time, an effective signal indicating that the cache read data is effective is fed to the execution section 83 (see an arrow 99 in FIG. 6).

In FIG. 6, an arrow 91 represents the data read request and the read address fed from the address generator 82 to the cache unit control circuit 86. In addition, an arrow 94 represents the data read request and the read address fed from the cache unit control circuit 86 to the main memory 2. An arrow 101 represents the read addresses fed from the address generator 82 to the continuous address detection circuit 84. Further, an arrow 102 represents the continuous address flag fed from the continuous address detection circuit 84 to the cache unit control circuit 86.

The second embodiment, similarly to the first embodiment, has the following advantages. It is possible to realize a cache memory in which even if a cache miss occurs when data on a certain operation is read, a penalty imposed on operations which follow the certain operation and which have addresses continuous to that of the certain operation is light. If the execution of the subsequent operations that have continuous addresses becomes unnecessary midway, the execution of these subsequent operations can be cancelled.

The present invention is not limited to these embodiments but various changes and modifications can be made within the scope of the invention.

According to the present invention, if a cache miss occurs when data on a certain operation is read and the read addresses of operations which follow the certain operation are continuous to that of the certain operation for which the cache miss occurs, then the subsequent operations are executed simultaneously with the reading of data from the main memory. Therefore, it is possible to obtain an arithmetic operation comprised of a cache memory in which a penalty imposed on the subsequent operations is light.

According to the present invention, it is possible to obtain an arithmetic operation comprised of a cache memory which can cancel the execution of operations which follow a certain operation if the execution of the subsequent operations which have addresses continuous to that of the certain operation becomes unnecessary midway after a cache miss occurs for the certain operation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An arithmetic processor comprising:
    a processor that executes an instruction stored in an external main memory;
    a cache memory that stores the instruction output from the external main memory;
    a selector that is connected to the external main memory and the cache memory;
    an address generator that generates a read address upon receiving a request from the processor;
    a contiguous address detection circuit that detects whether a first read address currently generated by the address generator is contiguous to a second read address previously generated by the address generator; and
    a control circuit that controls the selector so that the instruction, which is stored in the external main memory at the first read address, is directly output to the processor if the contiguous address detection circuit detects that the first address is contiguous to the second address.

2. The arithmetic processor according to claim 1, wherein the control circuit controls the selector so that the instruction is not output to the processor when execution of the instruction is cancelled.

3. The arithmetic processor according to claim 2, wherein the contiguous address detection circuit transmits the read address with a flag being on to the control circuit when detecting that the first address is contiguous to the second address.

4. The arithmetic processor according to claim 3, wherein the contiguous address detection circuit transmits the read address with the flag being off when execution of the instruction is cancelled.

5. The arithmetic processor according to claim 2, wherein the address generator notifies the control circuit that the execution is cancelled.

6. The arithmetic processor according to claim 1, wherein the contiguous address detection circuit compares the first read address with a value obtained by incrementing the second read address by one.

7. The arithmetic processor according to claim 1, further comprising:
    a tag memory that holds an address tag indicating whether the instruction, which is stored in the external main memory at the first read address, is stored in the cache memory.

* * * * *